(No Model.) 4 Sheets—Sheet 1.

B. A. WEATHERBEE.
MACHINE FOR PICKING AND SEPARATING HOPS.

No. 526,594. Patented Sept. 25, 1894.

Witnesses.
Inventor:
Brayton A. Weatherbee.
By James L. Norris.
Atty.

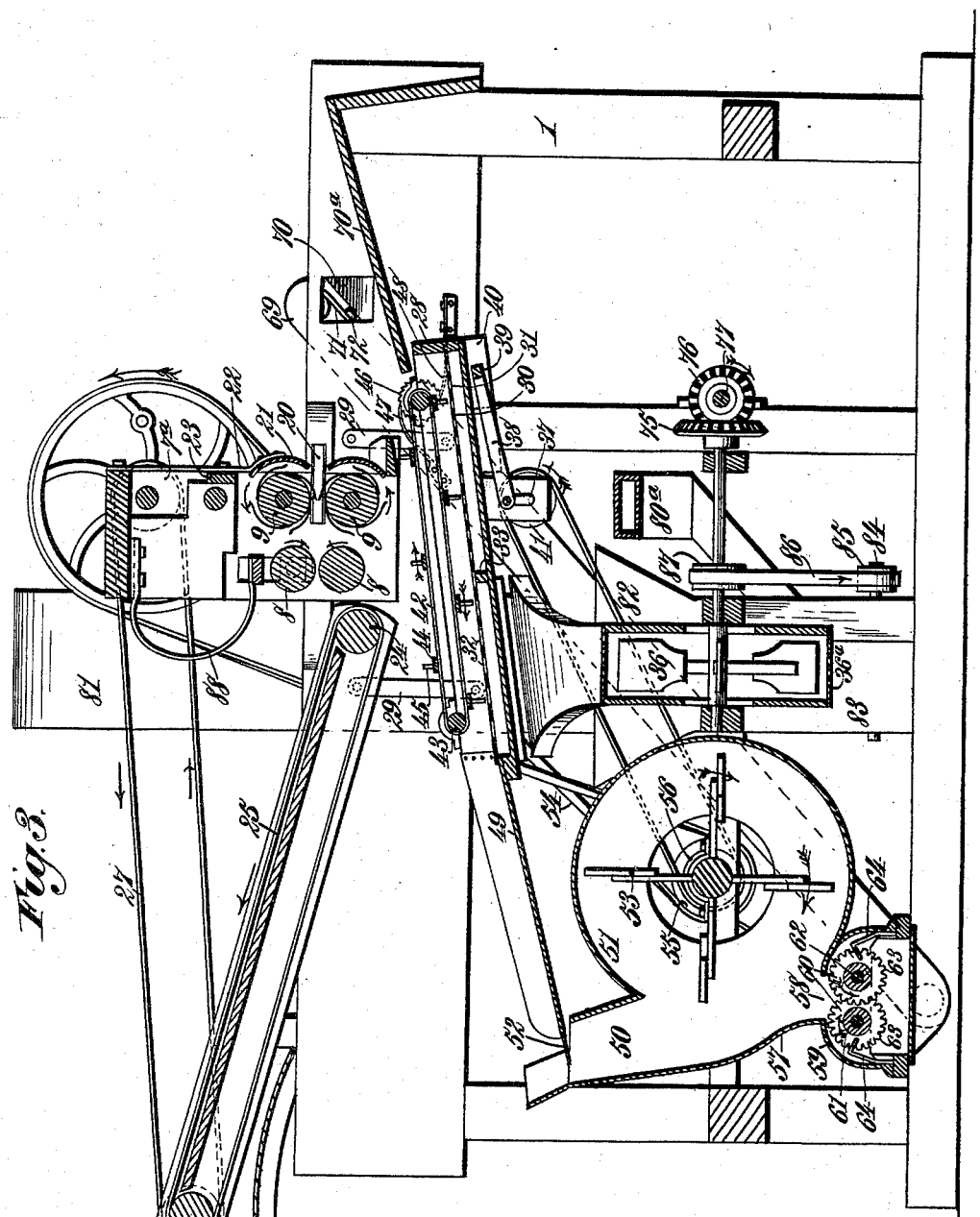

(No Model.) 4 Sheets—Sheet 3.
B. A. WEATHERBEE.
MACHINE FOR PICKING AND SEPARATING HOPS.
No. 526,594. Patented Sept. 25, 1894.
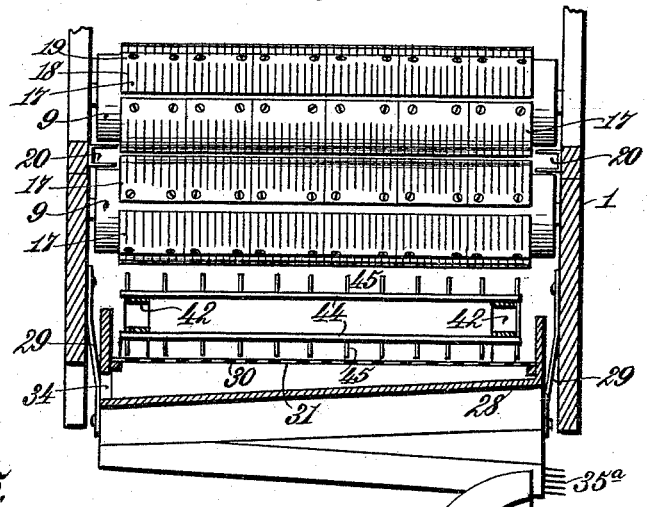
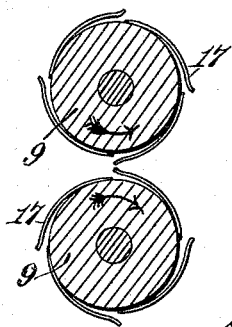
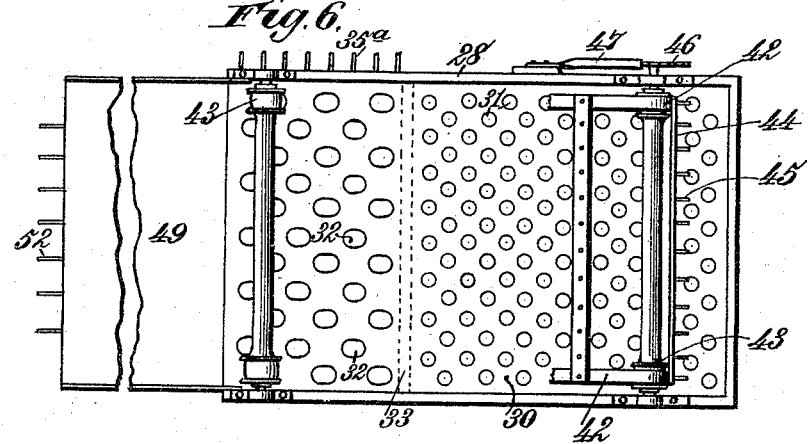
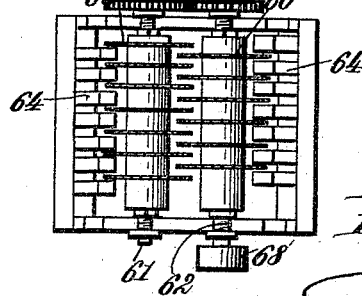
Witnesses.
Robert Emmett
Thos. A. Green
Inventor:
Brayton A. Weatherbee.
By James L. Norris
Atty.

(No Model.) 4 Sheets—Sheet 4.
B. A. WEATHERBEE.
MACHINE FOR PICKING AND SEPARATING HOPS.
No. 526,594. Patented Sept. 25, 1894.
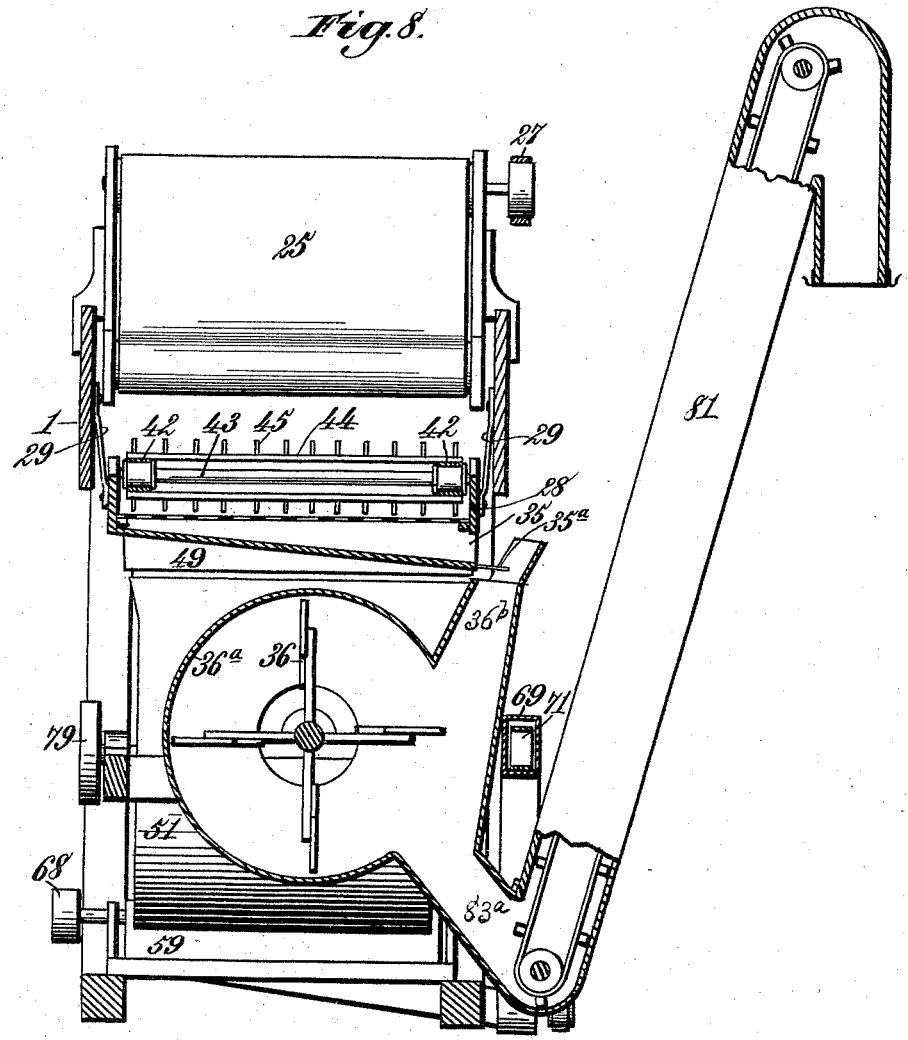

UNITED STATES PATENT OFFICE.

BRAYTON A. WEATHERBEE, OF WARREN, NEW YORK.

MACHINE FOR PICKING AND SEPARATING HOPS.

SPECIFICATION forming part of Letters Patent No. 526,594, dated September 25, 1894.

Application filed March 24, 1894. Serial No. 504,946. (No model.)

*To all whom it may concern:*

Be it known that I, BRAYTON A. WEATHERBEE, a citizen of the United States, residing at Warren, in the county of Herkimer and State of New York, have invented new and useful Improvements in Machines for Picking and Separating Hops, of which the following is a specification.

My invention relates to machines for picking and separating hops. It is my purpose to provide a mechanism of this type which may be driven by hand, or by power, and by which the vines may be fed and stripped, the leaves and refuse matter eliminated, and the hops separated therefrom and approximately assorted in such manner as to separate the larger from the smaller sizes, and the clusters of hops from both. It is my purpose, also, to provide a mechanism of this type having a repicking apparatus which is combined with the fan and air-conduit by which the hops are separated from the leaves and other trash; the arrangement being such that the clusters will pass to the repicking apparatus by their own weight, and after being duly and properly separated, or detached from the vines, will be again delivered to the sieve. It is my further purpose to combine with a hop-picking and separating machine a novel and simple form of sieve, and an endless rake mechanism, with novel means for operating the latter.

The invention consists in the several novel features of construction and new combinations of parts hereinafter fully described and then more particularly pointed out and defined in the claims making part of this specification.

To enable others skilled in the art to which my said invention pertains to fully understand and to make, construct, and use the same, I will now proceed to describe said invention in detail, reference being had for this purpose to the accompanying drawings, in which—

Figure 1:
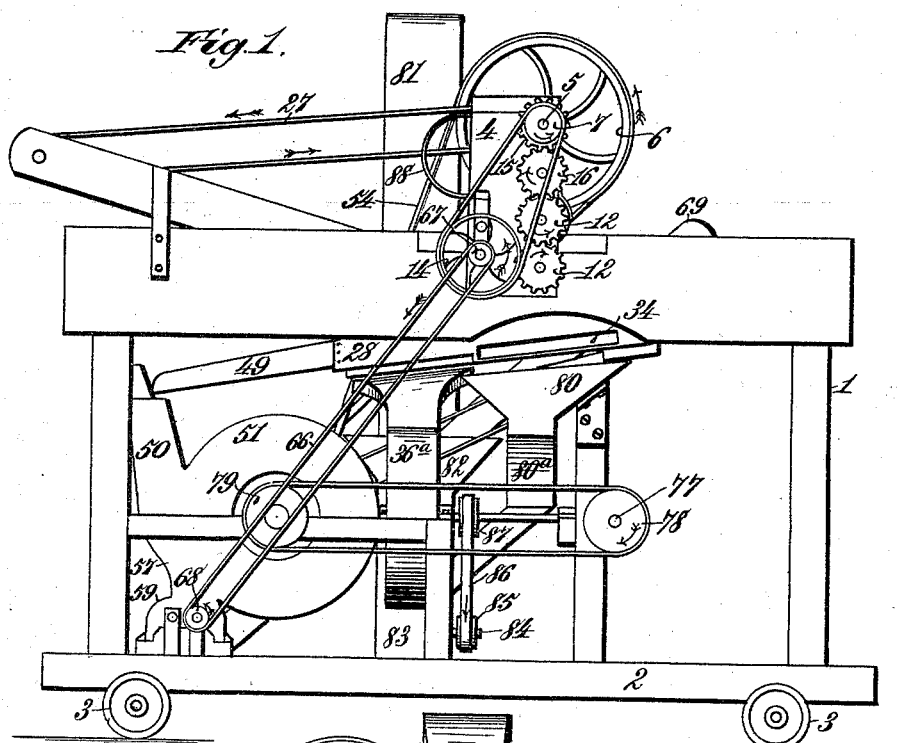
Figure 2:
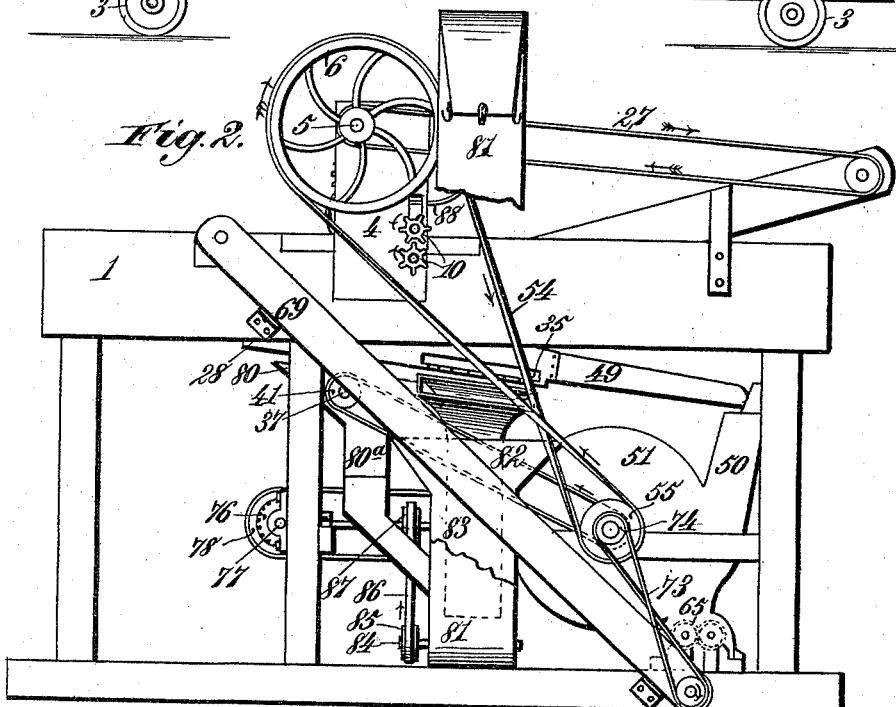

Figure 1 is a side elevation of the machine. Fig. 2 is an elevation taken from the opposite side. Fig. 3 is a vertical section taken from end to end of the machine, upon an enlarged scale, as compared with Figs. 1 and 2. Fig. 4 is a detail section, taken in a vertical plane a little in rear of the stripping rolls, looking toward the latter. Fig. 5 is a transverse section of the two stripping-rolls. Fig. 6 is a detail plan view of the sieve, showing a portion of the endless rake, part of the latter being broken away to show the construction of the sieve. Fig. 7 is a detail plan view showing the repicking apparatus. Fig. 8 is a transverse section, taken through the cross-fan and elevator, showing a construction differing slightly from that seen in the other figures.

In the said drawings, the reference-numeral 1 indicates the frame-work of the machine, which is of elongated, rectangular form, the bottom sills 2 being preferably mounted upon wheels 3, to facilitate removal from place to place. At, or near, the middle portion of the frame are arranged vertical posts, or uprights 4, which extend above the top of said frame and afford support for the main driving-shaft 5, which is arranged at, or near, the upper ends of said posts and extends across the frame 1, a pulley 6 being mounted upon one of the projecting ends of said shaft, and a pulley 7 upon the other end thereof. In the said posts 4 are also journaled, at points below the shaft 5, an upper and lower feed-roll 8, and an upper and lower stripping roll 9. The upper rolls in both pairs of rolls are in substantially the same horizontal plane, and the upper roll in each pair is geared with its lower roll to produce revolution in opposite directions, this connection being effected by spur-gears 10, upon the shafts of the feed-rolls 8, and similar gears 12 upon the shafts of the stripping-rolls 9. The feed-rolls 8 are driven by means of a belt-pulley 7, mounted upon the main driving-shaft 5 and belted to a comparatively large pulley 14, upon the shaft of the lower feed-roll 8. The stripping-rolls 9 are operated by a spur-gear 15, mounted on the same shaft 5, and communicating revolution through an intermediate gear 16 to the spur-gear 12 on the shaft of the upper stripping roll 9. By this arrangement the feed-rolls 8 produce traction in a direction opposite to that produced by the revolution of the stripping-rolls 9.

The feed-rolls 8 are smooth-surfaced and are formed of or covered with rubber, or any other suitable material which will grip the vines and carry them steadily forward in the direction of revolution. The stripping-rolls 9 are separated from each other by a narrow interval and each of said rolls is provided with several series of stripping fingers 17, arranged in substantial parallelism with the axis of the roll and at such points that, as the upper and lower rolls are turned in opposite directions, the points of the stripping fingers upon one roll will meet, or coincide in position, with the points of a series of fingers upon the other roll. Each series of these stripper-fingers is formed of substantially parallel, curved metallic strips, which are conveniently formed by slotting a strip of metal of suitable width, the slots 18 being formed transversely to the length of the strip and cut from one of the longer edges, or from one of the edges which lie parallel with the axis of the roll, toward the other or opposite edge, an integral portion 19, of suitable width, being left to support said fingers and to afford a base of attachment to the periphery of the stripping-roll. The stripping fingers are bent upon a curve the radius of which is greater than the radius of the roll upon which they are mounted, so that when secured upon the latter by means of screws passing through the integral portion 19, the curved fingers will gradually diverge from the surface of the roll in a direction opposite to that of rotation, as seen in Fig. 5. At their extremities the stripping-fingers are slightly turned outward to assist them in engaging the vines. The metal of which these fingers are composed is sufficiently elastic to avoid danger of their being bent into such form as would endanger the integrity of this part of the machine. Each series of fingers may be formed of a plurality of slotted metallic strips, each being suitably secured to the roll, as well as if a single strip of sufficient length were used. I have shown in the drawings four series of stripping-fingers upon each roll, but it is evident that this number may be varied, should circumstances require it.

The vines are caused to enter the machine by passing between the ends of the stripping-rolls 9, where lateral guides 20 are arranged, so placed that the ends of the vines may be inserted and pushed through until the feed-rolls 8 can engage them. The stripping rolls are denuded of fingers at points close to these guides, which may be arranged at a small angle so that the passage of the vines between the feed-rolls will cause them to be drawn toward the middle portion of the said rolls, thereby insuring their being brought within reach of the stripping-fingers. The vines may also be guided by the hand of the operator, after their ends are inserted between the feed-rolls 8. The stripping-rolls are covered, upon the side on which the vines enter, by hoods 21, a convenient support for the upper hood being provided by means of brackets 22, bolted, or otherwise secured to the transverse bar 23, and extending above the latter, to serve as means for fastening the parts in place.

Immediately in rear of and a little below the feed-rolls 8, is a roll 24, over which is carried an endless apron 25, suitable tension being given by a second roll 26, arranged at, or near, the rear end of the machine frame and at a higher point than the roll 24, so that the apron has an inclination. It is caused to travel at a suitable speed by a belt 27, carried from pulley 7$^a$, on the shaft 5, over a pulley on the roll 26. The stripped vines pass from between the feed-rolls 8 and are received by the apron 25, upon which they travel over the roll 26 and drop upon the ground.

Within the upper part of the machine-frame and beneath the feeding and stripping-rolls, is arranged a rectangular frame 28, arranged at a small inclination downward from the feed end toward the rear of the machine. The frame is suspended from the machine frame by means of hangers 29, which permit it to oscillate in a longitudinal line. Within said frame 28, and rigidly secured thereto is a sieve, 30, consisting of a metallic plate provided with openings 31, of suitable dimensions and arranged at suitable intervals, said openings extending over a portion of the sieve, another part thereof being provided with openings 32, which are larger in size, and elongated, or otherwise so formed that they will permit the passage of small clusters of hops. The bottom of the frame is closed, to form a chamber beneath the sieve, and this chamber is divided by a transverse partition 33 into two parts, one of which lies beneath the openings 31 of the sieve and the other beneath the openings 32. The floors, or bottoms of these two chambers have a slant, or downward inclination, one toward one side of the frame and the other toward the opposite side. The single hops, which pass through the openings 31, will therefore be carried to one side and will pass out through an opening 34, at the side of the frame 28 to be disposed of as hereinafter explained. The small clusters, passing through the larger openings 32 of the sieve, and usually consisting of two or three hops, only, will be carried toward the other side of the frame and be discharged through an opening 35. As there are always some leaves found with these clusters, they are separated by means of a cross-blast from a fan 36, arranged beneath the machine-frame, and driven at such speed as to create a moderately strong current of air which issues from the blower casing 36$^a$ immediately beneath the said opening 35, (Figs. 2 and 4) a series of points 35$^a$ being projected laterally from the lower wall of the opening, the interval between said points being such as to allow the hops to drop from their ends, the leaves being caught by the blast, which is graduated to carry the leaves off and allow the hops to fall.

The frame 28, carrying the sieve, is oscillated, or reciprocated, by means of a crank-shaft 37, journaled beneath the frame 28 and operating a pitman 38, the end of the latter being attached to a rock-shaft 39 mounted in brackets 40 at one end of the frame 28. The shaft 37 is provided with a pulley 41, which is belted to a pulley on the shaft of a blower, presently to be described.

Arranged above the sieve 30 is an endless rake, consisting of belts 42, arranged near the sides of the frame 28, and carried by pulleys 43. Upon said belts are mounted, at suitable intervals, bars 44, extending from side to side of the sieve and provided with rake-teeth 45. Upon the shaft of one of the pulleys 43 is a ratchet 46, with which a holding-pawl 47 has mesh, said pawl being mounted upon the frame 28. Rigidly mounted on the inner face of the frame 1 is a push-pawl 48, also engaging the ratchet 46, the oscillations of the frame 28 causing the pawl to advance the ratchet intermittently, and feed the endless rake in such manner as to sweep the hops and small clusters, together with the leaves, from the upper or higher end of the sieve to the lower end. At the lower end of the sieve is a tailing-board 49, the end of which overhangs the upwardly directed, open mouth of a blast-conduit 50, which forms part of a blower-casing 51. The overhanging end of the tailing-board is provided with a fringe of points 52, which lie directly over the mouth of the conduit, and extend for one half, or three-fourths the width of the blast opening or thereabout, so that the upward blast of air passes between them and over their extremities. This blast is delivered by a fan 53, in the blower-casing 51, said fan being driven by a belt 54, which connects the pulley 6 on the main shaft 5, with a small pulley 55 on the shaft of the fan. On the same shaft is also fixed a pulley 56 which carries the belt driving the pulley 41 on the crank-shaft 37.

The blast-conduit 50 is inclosed upon its outer, or rearward face, by a curved wall 57, which is practically a continuation of the exterior, cylindrical wall of the blower-casing. At, or a little below, the point where the curvature of this outer wall 57 passes into the straight, upwardly directed portion, is formed a transverse opening 58, provided with a hood, or shield 59. Directly beneath the opening 58 is arranged the repicking apparatus, which consists of two, alternating series of disks 60, carried by shafts 61 and 62, mounted in suitable bearings. The two series of disks 60 are so arranged upon their respective shafts that members of one series alternate with and enter between the members of the other series. The edges of the disks are serrated, or toothed, by cutting short, radial notches at substantially regular intervals, the ends of the teeth 63 thus formed being of the same width as their bases, or nearly so, and being, for this reason, blunt, instead of pointed. Upon any suitable rigid support, adjacent to each series of disks, are mounted stripper-plates or clearing devices 64, having their ends bent to enter between the serrated edges of the disks, for the purpose of keeping the latter clear of any accumulation of hops.

The shafts 61 and 62 of the repicking mechanism are geared together by spur-gears 65, so that they revolve in opposite directions the upper edges of the toothed disks 60 moving toward each other. The shafts carrying said disks are driven by a belt 66, connecting a pulley 67 upon one of the feed-roll shafts 8, with a pulley 68 on one of the shafts of the repicker.

The repicking apparatus is so arranged relatively to an elevator 69 that the hops separated from the clusters which are delivered to the repicking disks, are received by the elevator and carried up to a chute 70, which discharges them upon an incline 70ª, whence they pass to the elevated end of the sieve 30, by which they are assorted in the manner already described. I will presently explain what disposition is made of the hops which pass through the openings 31 and 32 of the sieve. The elevator 69 consists of an endless belt 71, provided with slats 72, or other suitable form of carriers, and driven by a belt 73, which is operated by a pulley 74 on the shaft of the fan 53.

The shaft of the fan 36 is provided with a bevel-gear 75, which meshes with a similar gear 76, mounted on a shaft 77, lying at right angles with the fan-shaft. The shaft 77 is provided with a pulley 78, (Fig. 1) which is belted to a pulley 79, upon the shaft of the fan 53. The air-conduit, or casing 36ª of the fan 36 is curved upward and laterally, relatively to the blower-casing, in order that it may deliver its blast at the proper point, relatively to the side-opening 35, beneath the sieve.

The hops passing through the openings 31 in the sieve 30, drop into the chamber beneath said openings and are carried by the inclined floor of said chamber to the lateral opening 34, through which they issue and fall by gravity into a hopper 80 which forms the mouth of a chute 80ª, the casing of which is so formed as to conduct the hops into the foot of an elevator-casing 81, which rises upon the side of the machine, and is entered by the chute 80 upon one side (Figs. 1, 2 and 3). The upper end of this casing 81 is provided with a discharge which opens downward, the construction being of any well known kind, provision being made for the attachment of a sack, or other suitable receptacle for the hops.

In disposing of the clusters of hops, which pass through the openings 32 of the sieve, I may use either of two constructions, one of which is shown in Figs. 1, 2 and 3, and the other in Fig. 8. The one consists of a hopper 82, arranged beneath the lateral opening 35 under the sieve, where it will catch the clusters of hops which pass through the blast from the cross-fan, the force of this blast being so regulated that it will carry off the leaves and trash, but will not materially affect the hops. The hopper 82 leads to a chute 83 which discharges into the lower part of the elevator-casing 81, from which they will be discharged into the sack, or other receptacle, beneath the discharging end of said casing. In the other construction, which is shown in Fig. 8, the disposition of the hops is the same and the mechanical functions are similar. The blast-conduit 36$^b$ of the cross-fan casing 36$^a$ is directed upward, however, so as to pass through the points 35$^a$, the construction being substantially the same as that in the fan 53, the blast conduit 50 thereof being arranged under the end of the tail board of the sieve, as seen in Fig. 3. Beneath the blast-conduit 36$^b$ of the cross-fan 36, the casing 36$^a$ opens into a chute 83$^a$, which leads into the lower part of the elevator-casing 81. The operation is so obvious as to require no explanation.

The elevator-belt in the casing 81 is provided, like the elevator 69, with slats, or other suitable carriers, of any familiar form, which need not be illustrated. Said elevator-belt is driven by a shaft 84, having a pulley 85, which is driven by a belt 86, receiving its motion from a pulley 87, carried by the shaft of the fan 53, (Figs. 1 and 3.)

The upper feed-roll 8 has bearing in journal-boxes which are movable vertically in suitable guides and are pressed downward by springs 88, to give a yielding grip upon the vines, to prevent crushing and tearing the latter by an excessive pressure of said rolls and to permit the passage of varying thicknesses, or diameters.

What I claim is—

1. In a hop-picking and separating mechanism, the combination with feed-rolls of rolls provided with elastic stripping-fingers arranged in longitudinal series on each roll, and diverging from the periphery from their bases toward their points, said rolls being arranged at such an interval that the points of said fingers are brought in contact by the opposite rotation of the rolls substantially as described.

2. The combination with feed-rolls of rolls provided with a plurality of series of longitudinally arranged, elastic stripping-fingers which diverge from the peripheries of said rolls from their rigidly attached bases toward their points, said divergence being in the direction of revolution of the oppositely rotating rolls, the latter being so arranged that the points of said fingers shall be brought together by said rotation substantially as described.

3. The combination with a pair of feed-rolls of an oppositely revolving pair of rolls, each of which is provided with elastic curved stripper-fingers arranged in two or more longitudinal series, rigidly mounted upon the surface of the roll and gradually diverging from said surface toward their free ends, said divergence being in the direction of revolution of the roll and the series upon the respective rolls being so arranged that, when the latter revolve in opposite directions, the free ends of the fingers in one series will meet, or coincide in position, with the free ends of the fingers of a series on the other roll, and a pair of feed-rolls, revolving in directions opposite to the corresponding stripping-rolls, substantially as described.

4. The combination with feed-rolls of oppositely revolving stripper-rolls, each provided with a plurality of longitudinal series of curved, elastic, stripping-fingers, and lateral guides arranged between the ends of the slightly separated rolls carrying the stripping-fingers, whereby the vines are passed to the feed-rolls, substantially as described.

5. The combination with a pair of feed-rolls of a pair of stripper-rolls revolving in directions opposite to the corresponding feed-rolls, elastic stripping-fingers arranged in several longitudinal series upon each stripper-roll and curved to diverge from the surfaces of the stripper-rolls in a direction opposite to the direction of the revolution, whereby the points of the opposite series of elastic, curved fingers will be brought in contact, and hoods, or shields arranged in front of the stripper-rolls and curved in approximate parallelism therewith, the free edges of said hoods being adjacent to each other and to the space between the stripper-rolls, the separation of said free edges being such as to allow the vines to pass through and to spread them laterally before reaching the stripping-rolls, substantially as described.

6. The combination with feeding and stripping-mechanism, of an oscillating sieve, consisting of a plate mounted in a hanging frame and provided with two groups of openings of different sizes, arranged over separate chambers having lateral discharge-openings arranged upon opposite sides of the machine, and a blower having an upwardly directed air-conduit, the open end of which lies beneath the end of a tail-board on the sieve provided with a fringe of points, substantially as described.

7. The combination with feeding and stripping mechanism, of an oscillating sieve provided with groups of openings of different sizes arranged over separate chambers having lateral discharge-openings, a blower having an upwardly directed air-conduit the open mouth of which lies beneath the end of a tail-board having a fringe of points, and a repicking apparatus arranged beneath an opening formed in the outer wall of the air-conduit, substantially as described.

8. The combination with feeding and stripping mechanism, of a sieve having suitable separating openings, a blower having an upwardly directed air-conduit the open end of which lies beneath the end of a tail-board having a fringe of points, and a repicking mechanism consisting of two, alternating series of toothed disks, the edges of one series being inserted between those of the other, said mechanism being arranged beneath an opening in the outer wall of the air-conduit, substantially as described.

9. The combination with a pair of feed-rolls of a pair of rolls carrying curved, elastic stripping-fingers arranged in longitudinal series on each of the rolls, an oscillating sieve having suitable separating openings, an endless rake consisting of two parallel belts supporting transverse toothed bars, transverse shafts having pulleys carrying the belts, a ratchet mounted on one of said shafts, a feeding-pawl mounted on the rigid frame of the machine, and a holding-pawl mounted on the oscillating frame of the sieve, substantially as described.

10. The combination with feed-rolls and rolls carrying curved, elastic stripping-fingers of an oscillating sieve consisting of a plate mounted in a hanging frame and provided with groups of openings of different sizes, said groups arranged over separate chambers having lateral discharge-openings, arranged upon opposite sides of the machine the floors of said chambers being inclined in different directions, and a blower delivering a cross-blast in front of the discharge-opening of one of said chambers, substantially as described.

11. The combination with feed-rolls of rolls carrying curved, elastic stripping-fingers, diverging from the surfaces of the rolls, a feed-apron to receive and remove the stripped vines, an oscillating sieve composed of a plate having groups of openings of different sizes arranged over separate chambers having lateral discharge-openings, a blower to deliver a cross-blast in front of the discharge-opening of one of said chambers, a separate blower having an upwardly directed air-conduit, the open mouth of which lies under the end of a tail-board having a fringe of points, a re-picking apparatus, consisting of two alternating, intersecting series of peripherally toothed, oppositely revolving disks, arranged beneath an opening in the outer wall of said air-conduit, curved hoods, or shields, arranged in front of the rolls carrying the stripping-fingers, and having an interval of separation to permit the passage of the flattened vines, and clearing plates arranged between the disks of the re-picking apparatus, substantially as described.

In testimony whereof I have hereunto set my hand and affixed my seal in presence of two subscribing witnesses.

BRAYTON A. WEATHERBEE. [L. S.]

Witnesses:
JAMES A. STORER,
LOWELL S. HENRY.